Figure 1:
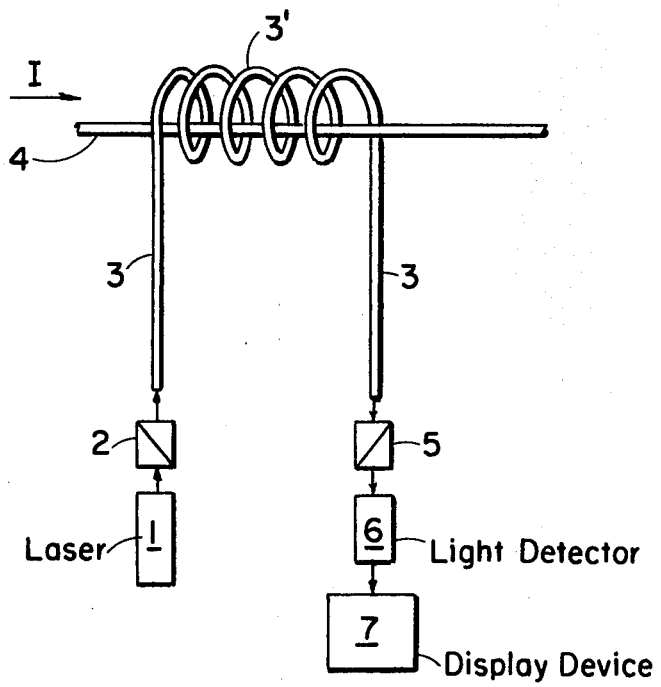

United States Patent

[11] 3,605,013

[72] Inventors Shogo Yoshikawa;
Atsufumi Ueki, both of Tokyo, Japan
[21] Appl. No. 874,926
[22] Filed Nov. 7, 1969
[45] Patented Sept. 14, 1971
[73] Assignee Nippon Selfoc Company, Limited
Tokyo, Japan
[32] Priority Nov. 16, 1968
[33] Japan
[31] 83680/68

[54] CURRENT-MEASURING SYSTEM UTILIZING FARADAY EFFECT ELEMENT
5 Claims, 2 Drawing Figs.
[52] U.S. Cl............................................. 324/96,
350/96 R, 350/151, 350/175 GN, 356/72
[51] Int. Cl........................................G01r13/40,
G01r 19/00, G02f 1/22
[50] Field of Search.......................................... 324/96;
350/151, 96 WG, 175 GN

[56] References Cited
UNITED STATES PATENTS
3,030,852   4/1962   Courtney-Pratt............. 350/151 X
3,324,393   6/1967   Casey et al................... 324/96
3,434,774   3/1969   Miller........................... 350/96

OTHER REFERENCES
Kawakami et al., Propagation Loss in a Distributed Beam Waveguide, Proceedings of the IEEE Dec. 1965 pp. 2148 and 2149 Copy in 350/96 (WG)

Primary Examiner—Gerard R. Strecker
Attorney—Sandoe, Hopgood and Calimafde

ABSTRACT: A current-measuring system comprises a fiberlike light guide capable of causing the Faraday effect. The guide is adapted to be placed in proximity to a current-carrying conductor. Polarized light is applied to one end of the guide, and the output of the guide is applied to an analyzer and a detector, thereby to provide an indication of the magnitude of the current flow in the conductor.

PATENTED SEP 14 1971 3,605,013

INVENTORS
Shogo Yoshikawa
Atsufumi Ueki
by
Sandoe, Hopgood & Calimafde
ATTORNEYS

CURRENT-MEASURING SYSTEM UTILIZING FARADAY EFFECT ELEMENT

The present invention relates generally to current-measuring systems, and particularly to a system of the type in which the rotation of the polarization plane of light rays is utilized in the measurement of current.

In conventional current-measuring systems, a great quantity of insulation material is required if the system is to be used in the measurement of currents accompanied by very high voltage values. It is also very difficult to utilize these conventional measuring systems to measure the current flowing in a power line located high above the ground.

To obviate these difficulties, a current-measuring system making use of the Faraday effect has been proposed. The Faraday effect may be defined as the rotation of the plane of polarization produced when plane-polarized light is passed through a substance in a magnetic field, the light travelling in a direction parallel to the magnetic field. For a given substance the rotation is proportional to the intensity of the magnetic field. The amount of such rotation of the plane of polarization per unit of magnetic field is determined by the Verdet constant of the substance. It is, however, impossible to utilize this system to measure current flowing through a powerline located above or distant from the measuring site, because no suitable medium is available for use as the light transmission path.

It is an object of this invention to provide a high voltage current-measuring system which overcomes the disadvantages found in the known current-measuring systems in that it can be used with safety, reliability and accuracy for the measurement of currents at high voltages and current flowing through power lines located high above the ground and remote from the measuring site.

To these ends, the current-measuring system of the present invention utilizes a fiberlike converging light guide having a large Verdet constant and flexibility, having a refractive index which is greatest along its axis and which decreases toward the periphery away from the axis. A light guide of this type is disclosed in copending application filed in the name of Teiji Uchida et al., Ser. No. 848,380 entitled FARADAY EFFECT ELEMENT AND METHOD OF MANUFACTURING SAME. Briefly described, that fiberlike light guide is produced by immersing a thin elongated glass body containing either a paramagnetic or diamagnetic oxide having a first cation into a bath of salt including second cations. The second cations are caused to be diffused into the glass body so that the second cations are substituted for the first cations. The fiberlike converging light guide disclosed in said copending application has a refractive index distribution in the section perpendicular to the center axis, which is greatest at the axis and decreases toward the surface thereof and contains a paramagnetic material or diamagnetic oxide material. The element has a large Verdet constant as compared to conventional fiberlike guides. When a current measurement is to be made of the current flow in a distant power line by use of light rays, it is necessary to minimize light loss in the transmission and reception of the light rays. Because of the large Verdet constant and easy operability, the converging light guide utilized in the present invention is admirably well suited for use in high voltage current measurement.

The converging light guide is wound around the power line or the like and the current flowing through the light guide can thus be measured from a distant measuring point.

More particularly, the present invention, in the embodiment described herein, comprises a laser oscillator with a linear polarizer, a flexible fiberlike light guide element which forms a path for the light rays supplied from said oscillator, a part of which contains the paramagnetic or diamagnetic material, and is wound around the power line conductor. As stated above, the light guide has a refractive index which is greatest at its axis and decreases toward the surface thereof. The system further comprises an analyzer for deriving a signal whose intensity varies in response to the polarizing direction of the light ray emerging from the light guide element, a light detector for detecting the output of the analyzer, and a display device for displaying the output of the light detector.

Figure 2:
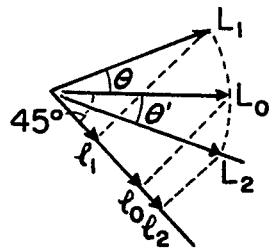

To the accomplishment of the above and to such further objects as may hereinafter appear, the present invention relates to a current-measuring system as defined in the appended claims and as described in the following specification, taken in conjunction with the following drawing, in which:

FIG. 1 is a schematic diagram of a current-measuring system embodying features of the invention; and FIG. 2 is a vector diagram showing the polarization direction relationship between the analyzer input and the analyzer output.

The current-measurring system of the invention shown in a preferred and schematic form in FIG. 1 comprises a laser oscillator 1 and a polarizer 2 positioned at the output end of oscillator 1. Polarizer 2 thus receives the light output from oscillator 1 and is effective to linearly polarize the laser light rays. The output light signal from polarizer 2 is applied to one end of a converging light guide or optical fiber 3. Light guide 3 has the characteristic that its refractive index is greatest along its longitudinal axis and decreases gradually and monotonically away from the axis toward its outer periphery or surface. The foregoing light guide and the method of manufacturing the same has been described above sufficient to permit an understanding of the invention disclosed herein. Light guide 3 has an intermediate portion 3' which contains paramagnetic or diamagnetic material for producing the Faraday effect as set forth in said copending application and which is wound about but insulated from a conductor 4 through which the current I to be measured is caused to flow. An analyzer 5 is positioned at the other output end of light guide 3 and is effective to derive a rotatory polarization component produced in proportion to the current I in conductor 4. A light detector 6 receives and detects the output of analyzer 5 and a display device 7 receives the output of detector 6 and serves to provide a display of the output of the light detector.

The selection and design of the elements shown in block form in the system of FIG. 1 for the purposes described is believed to be well within the scope of those having ordinary skill in the optical art and, as a result, no further description of these elements will be provided herein.

FIG. 2 shows the relationship between the output vectors $l0$, $l1$ and $l2$ of the analyzer 5 and the circuit angles $\theta$ and $\theta'$ formed by the Faraday effect under the condition that the polarizer 2 and the polarizer analyzer 5 are positioned so that their light axes form an angle of 45°. When the current flowing in the the difference 4 is zero, the linearly polarized light ray incident onto light guide 3 supplied from laser oscillator 1 through polarizer 2 does not cause rotatory polarization. This light ray is applied as $L_0$ to the analyzer 5. Due to the rotatory polarization, polarized components of magnitude $l0$ emerge as an output from analyzer 5, since polarizer 2 and analyzer 5 are disposed so that their light axes are at an angle of 45°. When current I flows through conductor 4, a magnetic field is produced around the conductor 4. The light rays passing through the intermediate portion 3' of light guide 3 are polarized in proportion to that magnetic field, with the rotatory polarization of an angle $\theta$ or $\theta'$ from $L_0$. The light ray thus reaches analyzer 5 as $L_1$ or $L_2$ and an output of magnitude $l1$ or $l2$ is obtained from the analyzer. The output of analyzer 5 is detected by light detector 6 and is there converted into a value corresponding to the difference between the analyzer output and the reference polarizer output $l0$. The converted output is displayed on display device 7 whereby the value of the measured currents is determined. To enable display device 7 to display the output of light detector 6, various methods may be employed; for example, the light signal may be converted into an electrical signal, or the output of light detector 6 may be converted directly into a light signal corresponding to the difference between the analyzer output and the polarizer output.

As has been described, the current-measuring system of the invention facilitates current measurement on a high voltage circuit located remote from the measuring point, without resorting to a complex, bulky and expensive insulation arrangement as required in the prior art, by the use of a converging light guide wound around the high voltage power line. The material of intermediate portion 3' of light guide 3 is preferably made of a material, such as a diamagnetic oxide material, having a relatively high Verdet constant.

The foregoing specification describes only the case in which the axes of polarizer 2 and analyzer 5 are displaced by 45° from each other. Needless to say, the invention is not limited to this arrangement. Moreover, the converging light guide may be inserted into the wound wire. In addition, the converging light guide may be wound around the high voltage power transmission line in advance when installed on the power line. This arrangement will simplify the current measurement.

Thus, while only a single embodiment of the present invention has been herein specifically disclosed, it will be apparent that variations may be made therein without departure from the spirit and scope of the invention.

We claim:

1. A system for measuring the current flowing through a longitudinal conductor, said system comprising a flexible fiberlike transparent body having a refractive index which is greatest at the axis of said body and decreasing gradually toward the periphery thereof, at least a part of said body comprising material capable of causing the Faraday effect, a source of laser light rays, said part of the body being wound about but insulated from the conductor, a polarizer disposed intermediate said light source and the input end of said body for linearly polarizing said light ways incident thereon, an analyzer disposed at the output end of said body with its optical axis in a predetermined angle with respect to that of said polarizer, said analyzer and polarizer being located remote from said body part and from the conductor, and means coupled to said analyzer for providing an indication of the measured current corresponding to the output of said analyzer.

2. The measuring system of claim 1, in which said predetermined angle is 45°.

3. The measuring system of claim 1, in which said light source is a laser.

4. The measuring system of claim 1, in which said body material is paramagnetic.

5. The measuring device of claim 1, in which said body material is diamagnetic.